(12) United States Patent
Kikuchi et al.

(10) Patent No.: US 6,592,649 B2
(45) Date of Patent: Jul. 15, 2003

(54) METHOD OF PRODUCING IRON NUGGETS (75) Inventors: Shoichi Kikuchi, Osaka (JP); Yasuhiro Tanigaki, Osaka (JP); Koji Tokuda, Osaka (JP); Osamu Tsuchiya, Kobe (JP); Shuzo Ito, Osaka (JP)

(73) Assignee: Midrex International B.V. Zurich Branch, Zurich (CH)

( * ) Notice: Subject to any disclaimer, the term of this patent is extended or adjusted under 35 U.S.C. 154(b) by 13 days.

(21) Appl. No.: 09/892,546

(22) Filed: Jun. 28, 2001

(65) Prior Publication Data
US 2002/0033075 A1 Mar. 21, 2002

(30) Foreign Application Priority Data

Jun. 28, 2000 (JP) ........................... 2000-194726

(51) Int. Cl.[7] .............................................. C21B 11/00
(52) U.S. Cl. ............................................ 75/504; 75/484
(58) Field of Search ........................................... 75/504

(56) References Cited

U.S. PATENT DOCUMENTS

| 3,443,931 A | | 5/1969 | Beggs et al. | |
| 3,993,471 A | * | 11/1976 | Yoshimura et al. | ........... 75/742 |
| 5,531,805 A | | 7/1996 | Worner | |
| 6,214,087 B1 | * | 4/2001 | Hoffman et al. | ............... 75/484 |
| 2001/0054329 A1 | * | 12/2001 | Hoffman et al. | ............... 75/386 |

FOREIGN PATENT DOCUMENTS

| EP | 0 916 742 | 5/1999 |
| EP | 0 952 230 | 10/1999 |
| WO | WO 97/06281 | 2/1997 |

* cited by examiner

Primary Examiner—Melvyn Andrews
(74) Attorney, Agent, or Firm—Oblon, Spivak, McClelland, Maier & Neustadt, P.C.

(57) ABSTRACT

The present invention provides a method of producing metallic iron nuggets with a high yield and good productivity, and more particularly a method which can produce metallic iron nuggets which have a high Fe purity and are excellent in transporting and handling due to a large grain diameter with a high yield and good productivity, when they are produced by reducing and melting raw material containing iron oxide such as iron ore and carbonaceous reducing agent such as coke. The method of producing metallic iron nuggets comprises steps of: heating raw material containing carbonaceous reducing agent and iron oxide-containing material in a reducing/melting furnace, reducing iron oxide in the raw material, and then heating and melting the metallic iron produced by the reduction and simultaneously making it coalesce while separating the metallic iron nuggets from slag components characterized in that the fixed carbon content ratio as the carbonaceous reducing agent is at least 73% and the volatile matter content in the raw material is not more than 3.9% are used, and the mixing content of carbonaceous reducing agent is restrained to be not more than 45% in relation to the iron oxide components, which is contained in the iron oxide-containing material of the raw material.

15 Claims, 8 Drawing Sheets

FIG. 1

METALLIC IRON  SLAG

METHOD OF PRODUCING IRON NUGGETS

BACKGROUND OF THE INVENTION

1. Filed of the Invention

The present invention relates to a method of producing iron nuggets, and more particularly, an improved method which can produce metallic iron nuggets which have a high Fe purity and are excellent in transporting and handling due to a large grain diameter with a high yield and good productivity, when they are produced by reducing and melting raw material containing iron oxide such as iron ore and carbonaceous reducing agent such as coke.

2. Description of the Related Art

In connection with the methods for producing metallic iron nuggets by heating and reducing raw material containing an iron oxide source such as iron ore and carbonaceous reducing agent such as coke and coal powder, and subsequently heating and melting it, many proposals have already been made as can be seen from, for example, Japanese Patent Laid-open Publications Nos. Hei 9-256017, Hei 11-335712 and etc. In these publications, it was found that the improvement of productivity of metallic iron nuggets can be accomplished by heating reduced iron produced by reduction and lowering a melting point of the reduced iron by carburizing the reduced iron, because its melting is promoted.

However, while these publications disclose that metallic iron nuggets with high Fe content can be obtained by making metallic iron nuggets while separating slag collaterally produced in the reduction process, when the metallic iron produced by reduction is molten, it can not be said that reviews as to how to produce the metallic iron, with a high yield, as metallic iron nuggets having a grain size distribution which renders it easy to transport and handle them has been made so sufficiently. Furthermore, depending on the quality of raw material and mixture, sometimes it may not be possible to obtain metallic iron nuggets having an appropriate grain diameter range as a product with a high yield, if the metallic iron nuggets contains slag due to insufficient separation of the metallic iron from the collaterally produced slag and slack proceeding of coalescing or becomes so fine granulated product that its separation becomes difficult in the melting process after reduction.

Additionally, in Japanese Patent Laid-open Publication No. Hei 9-310011, there is disclosed a technique for stabilizing the quality and the productivity of reduced iron obtained by restraining the volatile matter content contained in the carbonaceous material to prevent the bursting of pellets, when producing reduced iron pellets by heating and reducing the pellets containing carbonaceous material. However, the invention disclosed in the publication is to produce reduced iron by heating and reducing the iron oxide in the raw material pellets without melting the iron oxide and thus, although metallization rate itself is increased, the Fe purity itself of obtained reduced iron is considerably low because the obtained reduced iron contains a large quantity of slag component. Also, because this invention relates to a method of producing reduced iron which is not in the molten state, it is different from the technique for obtaining metallic iron nuggets of high Fe purity excluding slag component, and there is no doubt that the object for producing metallic iron nuggets of a target grain size distribution with a high yield does not arise from this invention.

Besides the above technique, numerous methods for producing reduced iron by heating and reducing raw material containing an iron oxide source and carbonaceous reducing agent or for producing metallic iron nuggets by re-melting the metallic iron after the heating and reducing process have been proposed. However, it is difficult to say that the hitherto known techniques for producing metallic iron nuggets are established as concrete techniques for producing metallic iron nuggets having an appropriate grain diameter range with a high yield by taking quality, handling and the like as raw material for iron manufacture, steel-making and alloy steel-making into collective consideration.

And, while it is desirable to use processed carbonaceous material such as coke and oil coke or good quality carbonaceous material such as smokeless coal and bituminous coal having a high fixed carbon content ratio, as carbonaceous reducing agent used for the raw material in producing metallic iron nuggets as explained in the above, recently, it becomes frequent to inevitably use low quality coal, such as brown coal according to the depletion of good quality coal, and if low quality coal is used as carbonaceous reducing agent, the quality or the yield of metallic iron nuggets which is finally obtained will be reduced and more particularly, various unexpected problems will be arisen when it is intended to obtain metallic iron nuggets of an appropriate grain size distribution.

SUMMARY OF THE INVENTION

The present invention is conceived considering the above situation, and it is an object of the present invention to establish a method of having a high Fe purity and producing metallic iron nuggets having an appropriate grain size distribution with a high yield and good productivity even when using low quality carbonaceous material as well as when using good quality carbonaceous material as carbonaceous reducing agent.

The producing method of solving the above problems according to the present invention comprises steps of heating raw material containing carbonaceous reducing agent and iron oxide-containing material in a reducing/melting furnace, reducing the iron oxide in the raw material, and then heating the produced metallic iron and simultaneously making it coalesce while separating the metallic iron from slag component, and is characterized in that the method uses carbonaceous reducing agent having a high fixed carbon content ratio.

As the above carbonaceous reducing agent that may be used in embodying the present invention, the fixed carbon content ratio contained in the reducing agent is preferably at least 73% (which means mass percent and is used same meaning herein below), and more preferably, at least 74.5%, the volatile matter content contained in said raw material is restrained to be preferably not more than 3.9%, and more preferably, not more than 3.2%, and the mixing content of carbonaceous reducing agent is restrained preferably to be not more than 45%, and more preferably, not more than 44% in relation to iron oxide component contained in iron oxide-containing material of the raw material. Furthermore, it is desirable if the temperature at the time when the metallic iron produced by reduction is molten in said reducing/melting furnace is controlled preferably to be at least 1400° C. or 1460° C., because it becomes possible to obtain metallic iron nuggets having a relatively large grain diameter, with more high productivity.

As the above carbonaceous reducing agent in the range of preferable fixed carbon content, besides using only carbonaceous material with high fixed carbon content itself, it is desirable if good quality carbonaceous material with a high fixed carbon content and low quality carbonaceous material with a low fixed carbon content are jointly used and if it is possible to adjust the mixing ratio thereof to secure a predetermined fixed carbon content, because even the low quality carbonaceous material can be used without any trouble. Furthermore, it is desirable if a powdery carbonaceous material is charged adjacent to the raw material before the metallic iron produced by reduction within the reducing/melting furnace, because the powdery carbonaceous material can maintain the atmosphere adjacent to the raw material in a high reductive condition at the terminal stage of reduction, so that re-oxidation of the produced metallic iron can be certainly prevented, and at the same time, the carbonaceous material can serve as a carburization source to the metallic iron, so that the melting and the coalecing of metallic iron can be effectively performed at more lower temperature, thereby contributing to restrain thermal deterioration of the reducing/melting furnace, to reduce heat energy for operation and to improve the productivity of iron nuggets.

And, while the grain diameter of metallic iron nuggets obtained according to the present invention is not particularly limited to a certain range, the preferable range of the grain diameter is 2–50 mm and more preferable range is 3–40 mm, when collectively considering the separation efficiency from the slag collaterally produced at the time of manufacturing or the easiness in transporting and handling as a product and the like. Herein, the term, "metallic iron nuggets" does not essentially mean those having a true spherical shape and generally refers to all of the products having an elliptical shape, an egg shape, or those somewhat flattened from these shapes, and the above "preferred grain diameter" means a diameter if the metallic iron nuggets takes a true spherical shape, the mean value of long and short diameters if the metallic iron nuggets takes an elliptical or an egg shape, and the value obtained by dividing total sum of long diameter, short diameter and maximum thickness by 3 if the metallic iron nuggets takes somewhat flattened shape. According to the present invention, it is possible to obtain metallic iron nuggets having a grain diameter in the range of 3–40 mm with a yield of at least 80%, and even at least 90%.

And, the "fixed carbon in the carbonaceous reducing agent" means carbon component according to the definition and measuring method defined in JIS (Japanese Industrial Standards) M 8812, and the "volatile matter" is also defined in the same standard and contains volatile organic matter of low molecular weight hydrocarbon and the like such as $CH_4$, and absorbed $H_2$, $CO$, $CO_2$, moisture and the like, and the volatile matter further includes Zn and Pb if ore or some kinds of dust are used as iron oxide-containing material.

As a preferred aspect in embodying the present invention, it is also recommended to reuse carbonaceous reducing agent contained in said raw material which is discharged out of said reducing/melting furnace together with said metallic iron nuggets or a part or all of powdery carbonaceous material as carbonaceous reducing agent in said raw material.

As described in the above, according to the present invention, when producing metallic iron nuggets by reducing raw material containing iron oxide-containing material such as iron ore, iron oxide, or partially reduced products thereof (hereinafter, sometimes referred to as iron oxide source or iron ore and the like) and carbonaceous reducing agent such as coke or coal (hereinafter, sometimes referred to as carbonaceous material), and heating the produced metallic iron to be molten and simultaneously making the produced metallic iron coalesce while separating it from collaterally produced slag component, reducing agent having a high fixed carbon content is selected and used as said carbonaceous reducing agent serving as reducing agent, in particular for the iron oxide source in the raw material, and furthermore, the volatile matter content in the raw material, or the mixing content of the carbonaceous reducing agent to the iron oxide component is properly adjusted, whereby the melting and coalescing of metallic iron is promoted at the time of reducing and melting, and metallic iron nuggets with an appropriate grain size distribution can be obtained with good yield.

As raw material used herein, there is no particular limitation in type if it contains the above iron oxide source and carbonaceous material, and powdered homogeneous mixture, or the raw material may be used in compacted form such as pellets, briquettes or small masses, which are compacted using a binder and preferably have a diameter of about 3–30 mm calculated in terms of the mean grain diameter, in order to obtain metallic iron nuggets having a relatively large grain diameter as intended in the present invention, with more high yield and good productivity.

DETAILED DESCRIPTION OF THE PREFERRED EMBODIMENTS

Herein below, basic method adopted in the present invention will be more specifically described with reference to the drawings of embodiments and the reason why the above requirements are defined will also be clearly explained.

Figure 1:
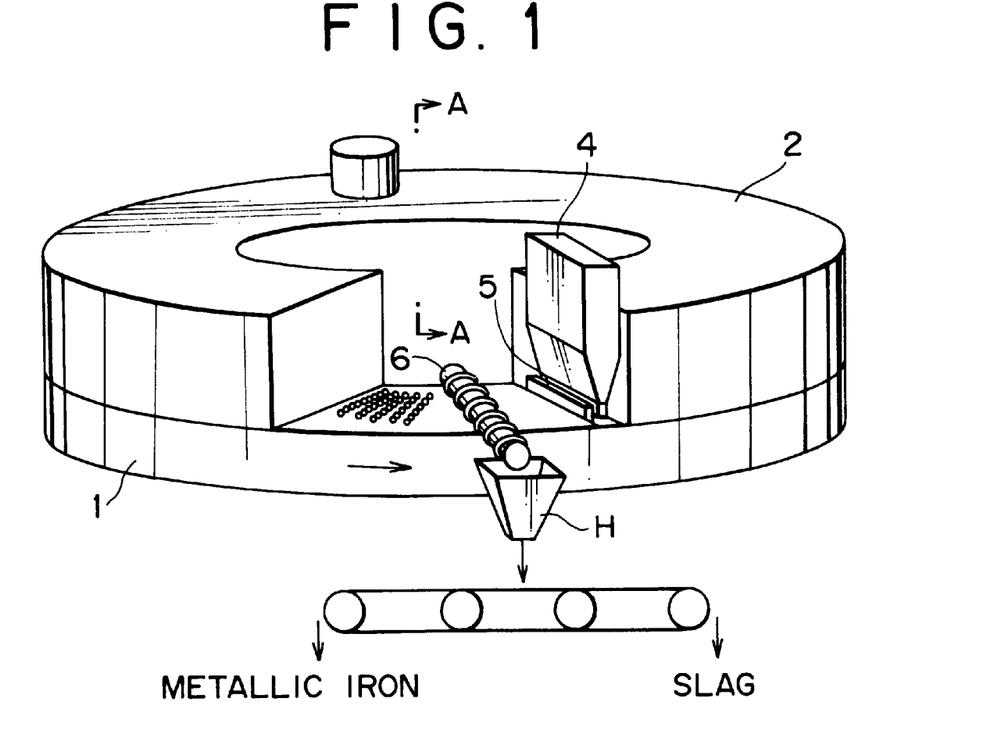
FIG. 1 is an explanatory view exemplifying reducing/melting equipment used in the present invention.
Figure 2:
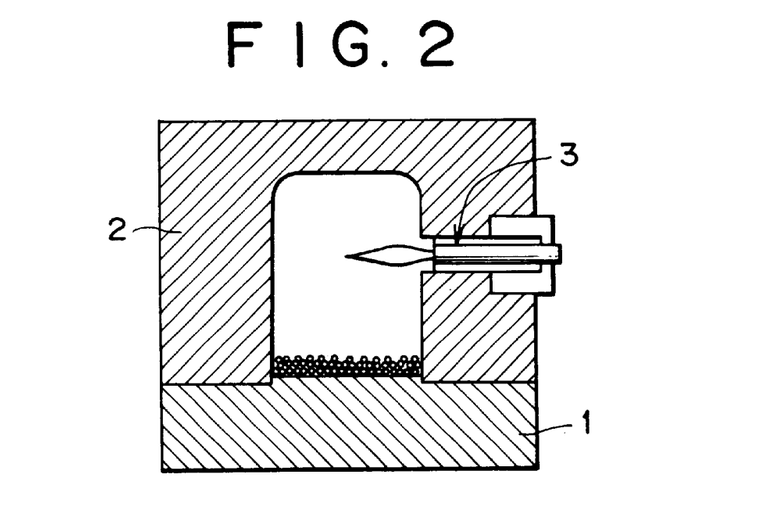
FIG. 2 is a cross sectional view corresponding to cross section taken along the line A—A in FIG. 1.
Figure 3:
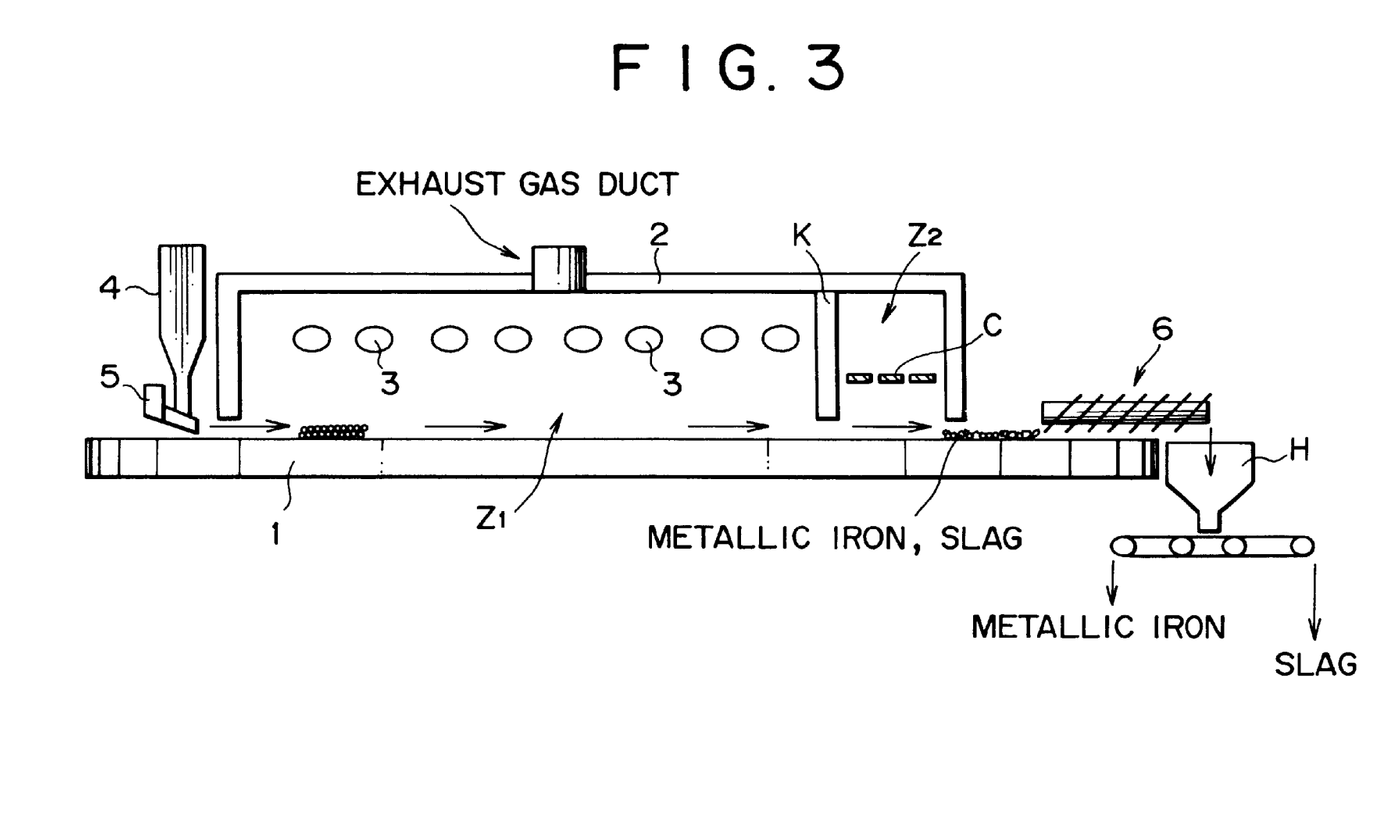
FIG. 3 is a cross sectional explanatory view showing the state that FIG. 1 is developed in the rotational direction of rotary type hearth.

FIGS. 1 to 3 are schematic explanatory views showing a movable hearth type reducing/melting furnace developed by the inventors and adopted to the present invention, a dome type furnace having a rotary hearth in the shape of donut, in which drawings FIG. 1 is a schematic view, FIG. 2 is a cross sectional view corresponding to cross section taken along A—A line, and FIG. 3 is a schematic cross sectional explanatory view showing the state that FIG. 1 is developed in the rotational direction of rotary hearth in order to help the understanding of the present invention. In the drawings, reference numeral 1 indicates a rotary hearth and reference numeral 2 indicates a furnace body covering the rotary hearth, in which the rotary hearth 1 can be rotated in a proper speed by a driving apparatus not shown in the drawings.

A plurality of combustion burners 3 are installed in proper places on the wall of the furnace body 2, and combustion heat of the combustion burners 3 and radiated heat thereof are transferred to raw material on the rotary hearth 1, whereby heating and reducing process of raw material is started. The furnace body 2 is shown as a preferred embodiment and its interior is divided into a reducing and melting zone $Z_1$ and a cooling zone $Z_2$ by one partition wall K. A charging means 4 for charging raw material and supplementary raw material toward the rotary hearth 1 is disposed in the uppermost stream side in the rotation direction of the furnace body 2 and at the same time, a discharging means 6 is mounted in the lowermost stream side in the rotation direction (which may be considered as the directly upper stream side of charging means 4 because of its rotary construction).

As a heat source for the heating and reducing/melting furnace, a burner heating type using gas, heavy oil, powdered coal, wasted plastic or the like as a fuel, or another type effectively using combustible gas produced in the furnace, in which oxygen or air is supplied to burn the gas, can be used. Furthermore, a regenerative burner also can be used. For discharging the produced metallic iron nuggets, a screw or an optional discharging apparatus such as a screw or a scraper can be used or a discharging method using gas jet or suction can be also adopted.

When operating this reducing/melting furnace, the rotary hearth 1 is rotated at a predetermined speed and raw material is supplied on the rotary hearth 1 from the charging means 4 by using a vibration feeder 5 and the like to become a proper thickness. When charging the raw material, it is charged typically to the range of 10–40 mm, preferably 20–30 mm and if compact (pellets, briquettes or the like) is used as the raw material, it is desirable to charge it to form a single layer, or stacked 3–10 layers, preferably 3–6 layers depending on its grain diameter and to increase the raw material charge quantity per unit area of hearth, thereby increasing productivity.

When the raw material is charged in a layer form, it is desirable to form an unevenness of an optional size on the surface of layered raw material, because effective heat transfer area of the surface can be increased so that heating efficiency for charged raw material can be more increased and at the same time, heating efficiency for raw material disposed in a lower layer can also be increased. The forming of unevenness can be performed by optionally adopting, for example, a method in which charging is performed by changing the charge quantity from a plurality of feeding openings in the widthwise of the hearth, a method in which charging is performed by changing the charge quantity from an unevenness-shaped hopper mounted to be extended in the widthwise of the furnace, a method of forming an unevenness by patterning a surface shaping member having unevenness after charging substantially horizontal, and the like.

The raw material charged onto the hearth 1 receives combustion heat and radiated heat from the combustion burners 3 during passing the reducing and melting zone $Z_1$, the iron oxide is reduced by carbon monoxide produced by a reaction between iron oxide contained in the raw material and carbonaceous reducing agent. The produced metallic iron is further heated under a carbon rich atmosphere so that the metallic iron is carburized and molten, and then separated from the collaterally produced slag and coalesces to be molten metallic iron nuggets. Thereafter, the metallic iron is cooled and solidified in the cooling zone $Z_2$ by an optional cooling means C and then sequentially discharged by the discharging means 6 mounted in downstream of the cooling zone C. At this time, the collaterally produced slag is discharged together with the metallic iron, the separation of metallic iron nuggets and slag is performed by an optional separating means (e.g. a sieve mesh or a magnetic separator), whereby it is possible finally to obtain metallic iron nuggets containing so low slag content that its Fe purity is at least 95%, more preferably, at least 98%.

And, if the atmospheric temperature is too high at the time of reducing (reduction period) in the above reducing and melting process, in particular, in certain period of reducing process, if the temperature becomes so high that it exceeds the melting point of slag composition consisting of gangue component, unreduced iron oxide and the like in the raw material, the slag of low melting point will be molten and react with the refractory material of the rotary hearth, whereby melting trouble is caused in the refractory material and thus the smooth hearth can not be maintained. Furthermore, if heat exceeding that needed in reducing iron oxide is applied in the reduction period, iron oxide in the raw material, FeO will be molten before reduced and so called smelting reduction in which the molten FeO reacts with carbon (C) contained in the carbonaceous material will be rapidly proceeded (The smelting reduction is a phenomenon that the reduction is proceeded in the molten state and therefore is different from the reduction). Metallic iron is also produced by the smelting reduction, and if the smelting reduction is occurred, it becomes difficult to continuously operate using a practical use furnace because FeO containing slag with high fluidity cause eminent melting trouble in the refractory material of hearth.

Such a phenomenon is varied depending on composition of slag forming components and the like, which are contained in iron ore, carbonaceous material or binder of raw material; if the atmospheric temperature at the time of reduction exceeds about 1400° C., melting trouble is caused in the refractory material of hearth by bleeding the low melting point slag as explained in the above, and if the temperature exceeds 1500° C., the undesired smelting reduction reaction is proceeded regardless of the type of raw material of iron ore and the melting trouble becomes eminent. Therefore, the temperature of reduction period is restrained preferably to be not more than 1500° C. and more preferably, not more than 1450° C. If the temperature of reduction period is too low, the reduction becomes difficult to be efficiently proceeded. Therefore, the temperature is set preferably to be at least 1200° C. and more preferably, at least 1300° C.

Following the reduction, the atmosphere temperature is raised by preferably about 50–200° C. to be 1400–1500° C., metallic iron produced by the reduction is molten and the molten metallic iron coalesces. At this time, the molten metallic iron coalesces with each other and thus become coarse. But because the metallic iron coalesces while excluding collaterally produced molten slag during that time, the metallic iron has a high Fe purity containing little slag, whereby metallic iron nuggets of high Fe purity can be obtained by cooling and solidifying the molten metallic iron and then separating metallic iron nuggets and slag using a sieve, a magnetic separator or the like.

Then, the melting of metallic iron produced by the reduction is proceeded by raising the atmospheric temperature to be at least the melting point of the metallic iron and it is desired if C or CO is present adjacent to the metallic iron starting to be molten, because the melting point is lowered due to carburization of metallic iron by these components so that the melting of metallic iron can be proceeded at lower temperature and within a shorter time. That is, in order to rapidly proceed this melting process, it is preferred that sufficient quantity of carbon for carburization is remained in the raw material after the reduction is completed and that the remaining carbon content may be adjusted by mixing content of iron ore and carbonaceous material in the raw material. Through a test, the inventors have confirmed that metallic iron produced by the reduction is rapidly carburized and its melting point can be lowered, so that it is possible to rapidly melt the metallic iron in the temperature range of 1300–1500° C., if the initial carbonaceous material mixing ratio is secured so that the remaining carbon content (i.e. excessive carbon content) in the reduced material is at least 1.5% under the situation that the final reduction ratio in the reduction period reaches to almost 100%, i.e. under the situation that the metallization ratio reaches to 100%.

The melting temperature of pure iron, whose carburization quantity is zero, is 1537° C. and can be molten when it is heated to a temperature higher than this temperature. In a practical use furnace, however, it is desirable to restrain the operating temperature as low as possible in order to reduce heat load applied to the refractory material of hearth, and is desirable to restrain the operating temperature to be not more than about 1500° C. in consideration of the melting point of collaterally produced slag.

In order to efficiently proceed the reduction while maintaining the raw material charged within the furnace in the solid state without causing partial melting of iron oxide contained in the raw material, it is preferred to adopt two-step heating method; performing the solid reduction while keeping the internal temperature of furnace, preferably in the range of 1200–1500° C., and more preferably in the range of 1200–1400° C. and after raising the internal temperature of furnace to the range of 1400–1500° C., melting the partially remained iron oxide simultaneously with reducing it and making it coalesce. By setting these conditions, it is possible to stably produce metallic iron nuggets with good productivity and to complete the reduction, melting and coalescing of iron oxide typically within 10 to 13 minutes.

When the above-described method is adopted to produce metallic iron nuggets, the present invention is characterized in that as the above carbonaceous reducing agent serving as reducing agent for iron oxide component contained in iron oxide-containing material, it uses reducing agent having a high fixed carbon content ratio and a low volatile matter content, or specifies mixing ratio of the carbonaceous reducing agent in relation to the iron oxide component contained in the iron oxide-containing material, thereby raising the yield of metallic iron nuggets. Herein below, this point will be described in detail.

FIGS. 4 to 9 are graphs showing the effects that each of the above conditions affects on the yield of metallic iron nuggets as a product, based on experimental data obtained from the embodiments as explained below. In these drawings, evaluation was made by the yield (recovery percentage mass %) of metallic iron nuggets that a grain diameter is grown to at least 3.5 mm as one reference for securing an appropriate grain size distribution in transporting and handling as a product. Herein, iron oxide component contained in iron oxide-containing material is iron oxide, because iron ore is used as the iron oxide-containing material.

Figure 4:
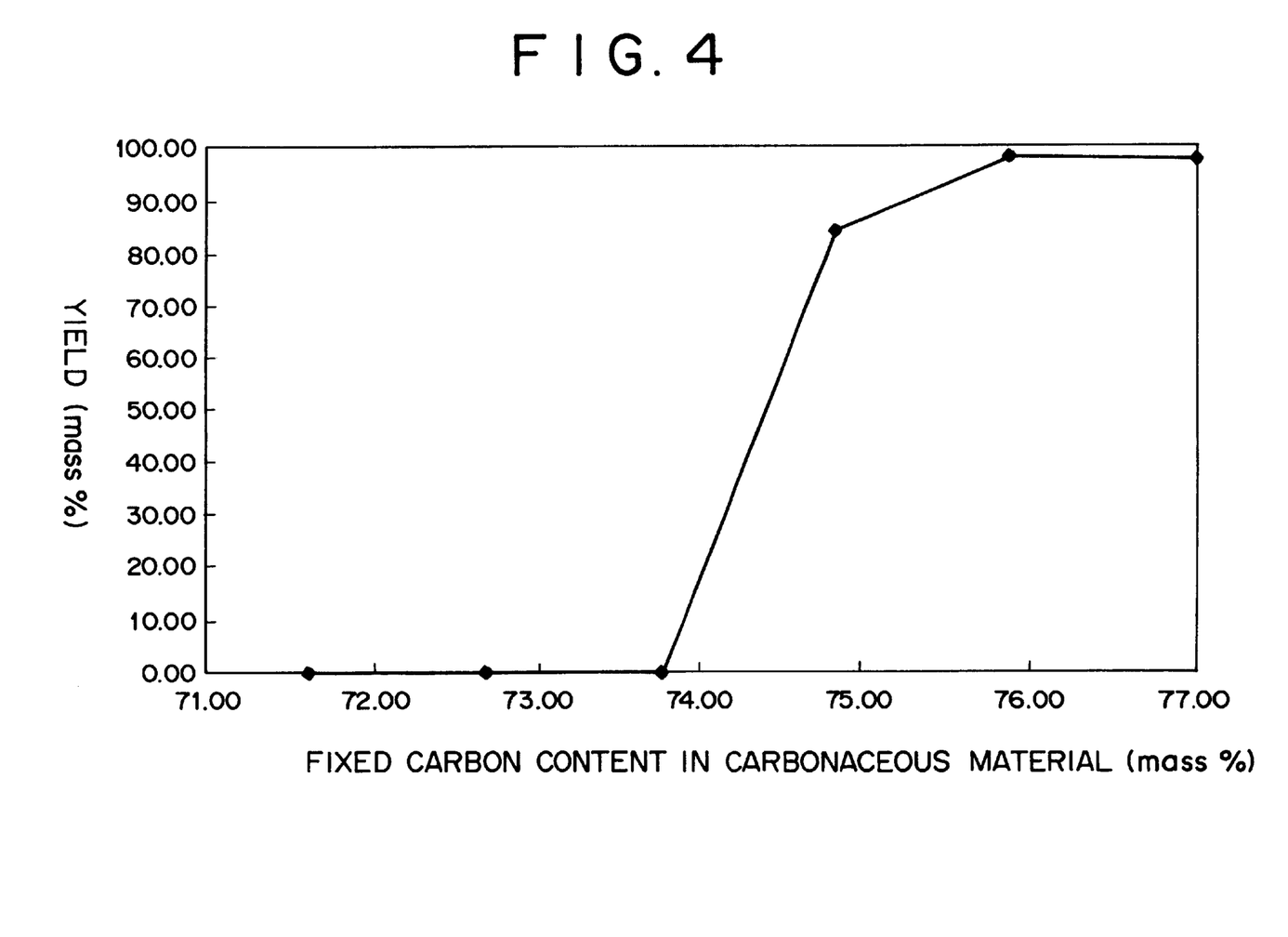
FIG. 4 is a graph showing the effects that the fixed carbon content in carbonaceous material affects on the yield of metallic iron nuggets when the melting temperature is set to 1400° C.
Figure 5:
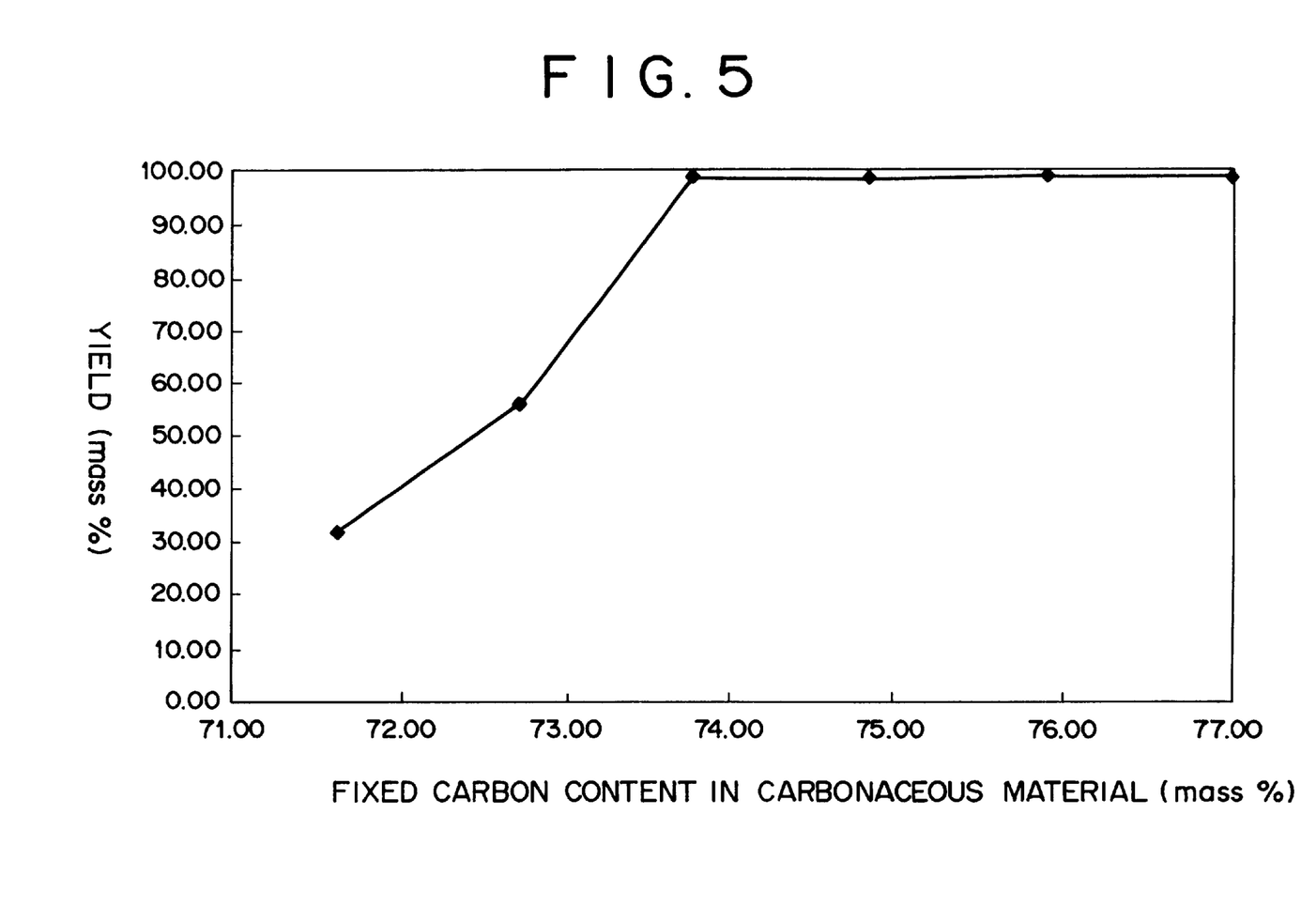
FIG. 5 is a graph showing the effects that the fixed carbon content in carbonaceous material affects on the yield of metallic iron nuggets when the melting temperature is set to 1460° C.

First, FIGS. 4 and 5 are graphs showing the effects that the fixed carbon content in carbonaceous material mixed as raw material provides to the yield, in which drawings FIG. 4 shows the effects when the melting temperature of metallic iron reduced by reduction is set to 1400° C. and FIG. 5 shows the effects when the melting temperature of metallic iron reduced by reduction is set to 1460° C. As apparent from these drawings, the yield of metallic iron nuggets is considerably changed depending on the temperature of melting; when the melting temperature is set to 1400° C., the yield abruptly increases about the fixed carbon content of 74% in carbonaceous material, and at least about 80% of the yield of target grain size distribution of metallic iron nuggets can be secured if using carbonaceous material having at least 74.5% of the fixed carbon content, further and at least 90% of the high yield can be secured if the fixed carbon content is at least about 75%. As compared to this, when the melting temperature is set to 1460° C., the yield abruptly increases about the fixed carbon content of 72% as shown in FIG. 5, and at least about 80% of the yield of target grain size distribution of metallic iron nuggets can be secured if using carbonaceous material having at least about 73% of the fixed carbon content, further and at least 90% of the high yield can be secured if the fixed carbon content is at least about 73.5%. As can be seen from these results, when a carbonaceous material having at least 73% of the fixed carbon content is used, it is possible to produce metallic iron having an appropriate grain diameter with at least 80% of the high yield by setting the melting temperature to be at least 1460° C., and when good quality carbonaceous material having at least a level of 74.5% of the fixed carbon content is used, it is possible to secure a sufficient yield even if the melting temperature is lowered to about 1400° C.

When the fixed carbon content in the carbonaceous material is at least about 73% or at least about a level of 74.5%, it is possible to use the carbonaceous material only. Furthermore, the case of low quality carbonaceous material having the fixed carbon content less than 73% can be used without any trouble, if the above appropriate fixed carbon content can be totally secured by using high quality carbonaceous material having a high fixed carbon content ratio jointly, as a result, even it is low quality carbonaceous material which could have not been used alone can be effectively utilized.

Figure 6:
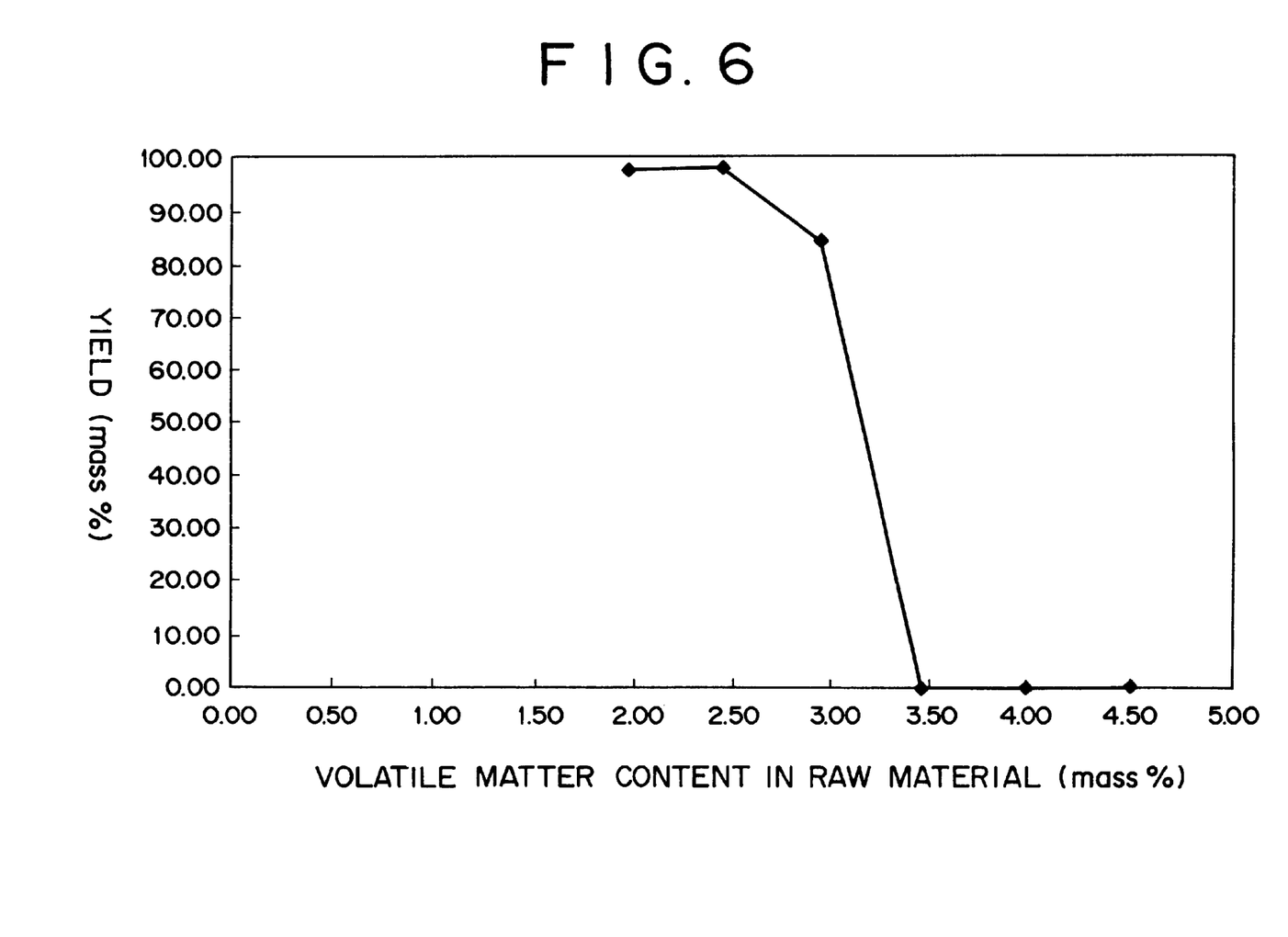
FIG. 6 is a graph showing the effects that the volatile matter content in raw material affects on the yield of metallic iron nuggets when the melting temperature is set to 1400° C.
Figure 7:
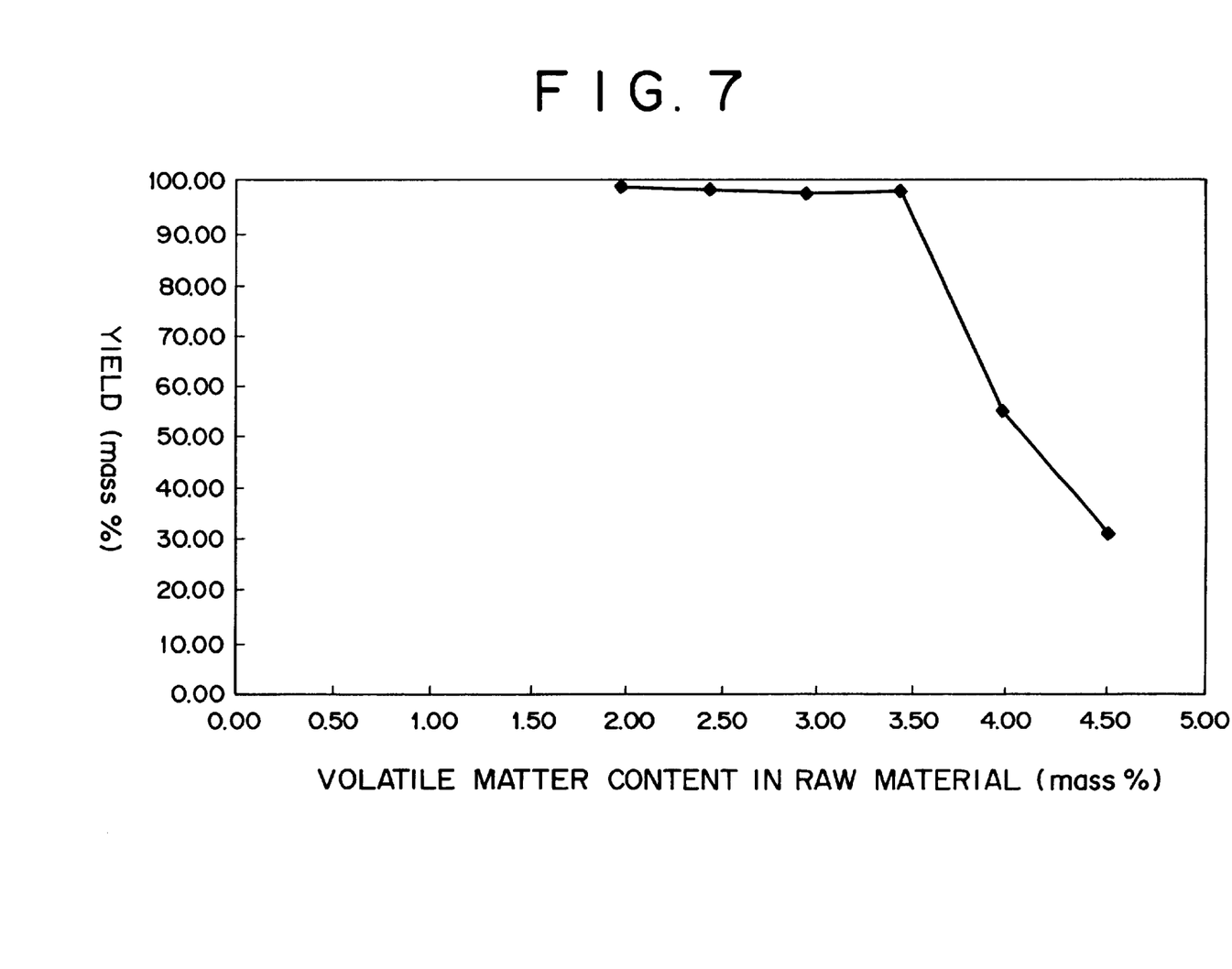
FIG. 7 is a graph showing the effects that the volatile matter content in raw material affects on the yield of metallic iron nuggets when the melting temperature is set to 1460° C.

Next, FIGS. 6 and 7 are graphs showing the effects that the volatile matter content in the raw material provides to the yield, in which drawings FIG. 6 shows the effects when the temperature at the melting period of metallic iron reduced by reduction is set to 1400° C. and FIG. 7 shows the effects when the temperature at the melting period of metallic iron reduced by solid reduction is set to 1460° C. As apparent from these drawings, also in this case, the yield of metallic iron nuggets is considerably changed depending on the temperature at the melting period; when the melting temperature is set to 1400° C., the yield abruptly decreases when the volatile matter content exceeds about 3.2%, and at least 80% of the yield can be obtained if the volatile matter content is not more than 80%, further and at least about a level of 90% of the high yield can be secured if the volatile matter content is not more than about 2.9%. As compared to this, it can be seen that when the melting temperature is set to 1460° C., while the yield abruptly decreases if the of volatile matter exceeds a level of 3.9%, and at least 80% of the yield can be obtained if the volatile matter content is not more than 3.9%, further and at least about a level of 90% of the high yield can be secured if the volatile matter content is restrained to be not more than a level of 3.7%. As apparent from these results, it can be seen that when the above volatile matter content is in a level of 3.8%, it is possible to produce metallic iron having an appropriate grain diameter with at least 80% of the high yield by setting the melting temperature to be at least about 1460° C. and when the volatile matter content is not more than a level of 3.2%, it is possible to secure a sufficient yield even if the melting temperature is lowered to about 1400° C.

Figure 8:
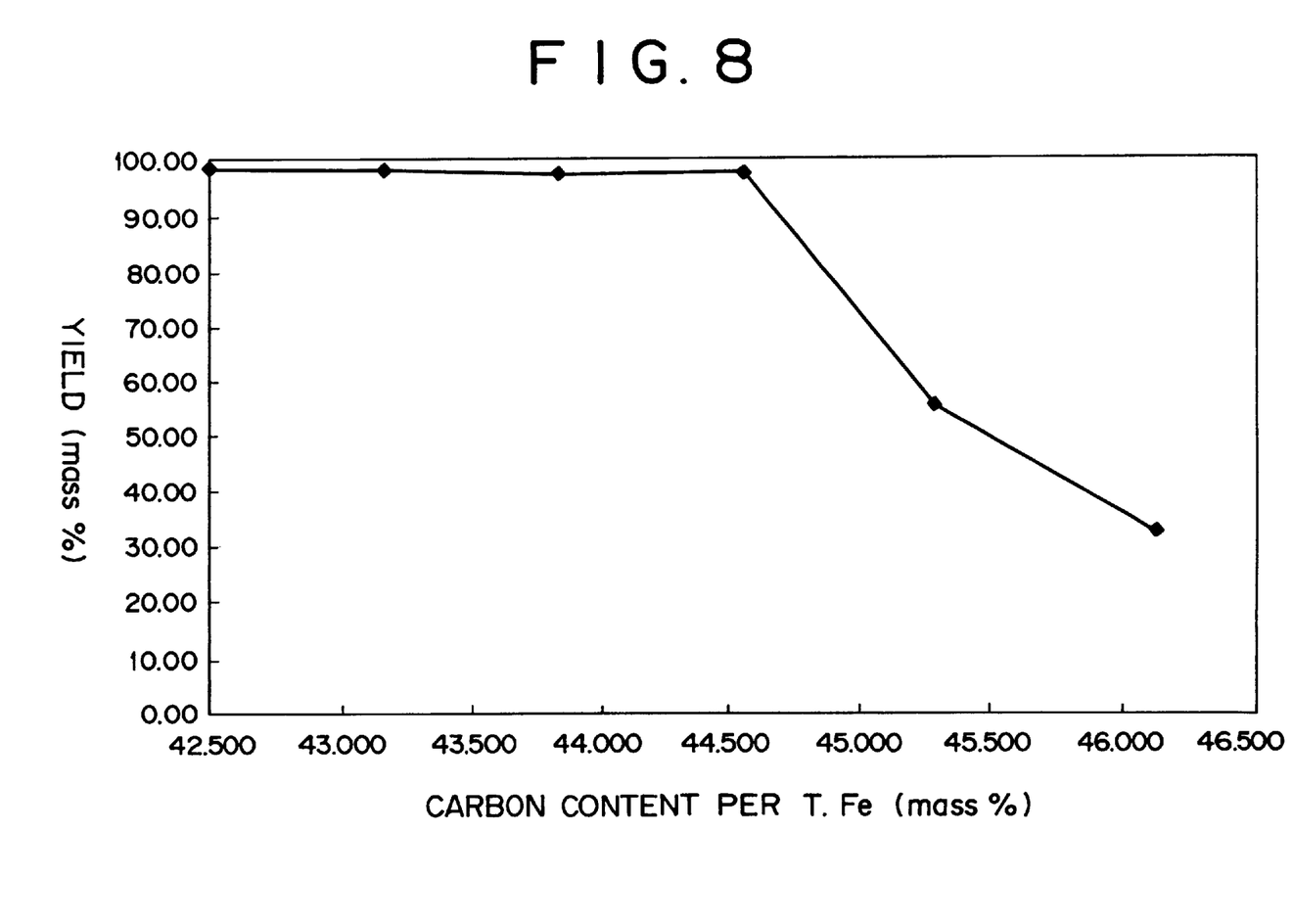
FIG. 8 is a graph showing the effects that the carbonaceous material content in relation to the quantity of T. Fe in iron ore of the raw material affects on the yield of metallic iron nuggets when the melting temperature is set to 1400° C.
Figure 9:
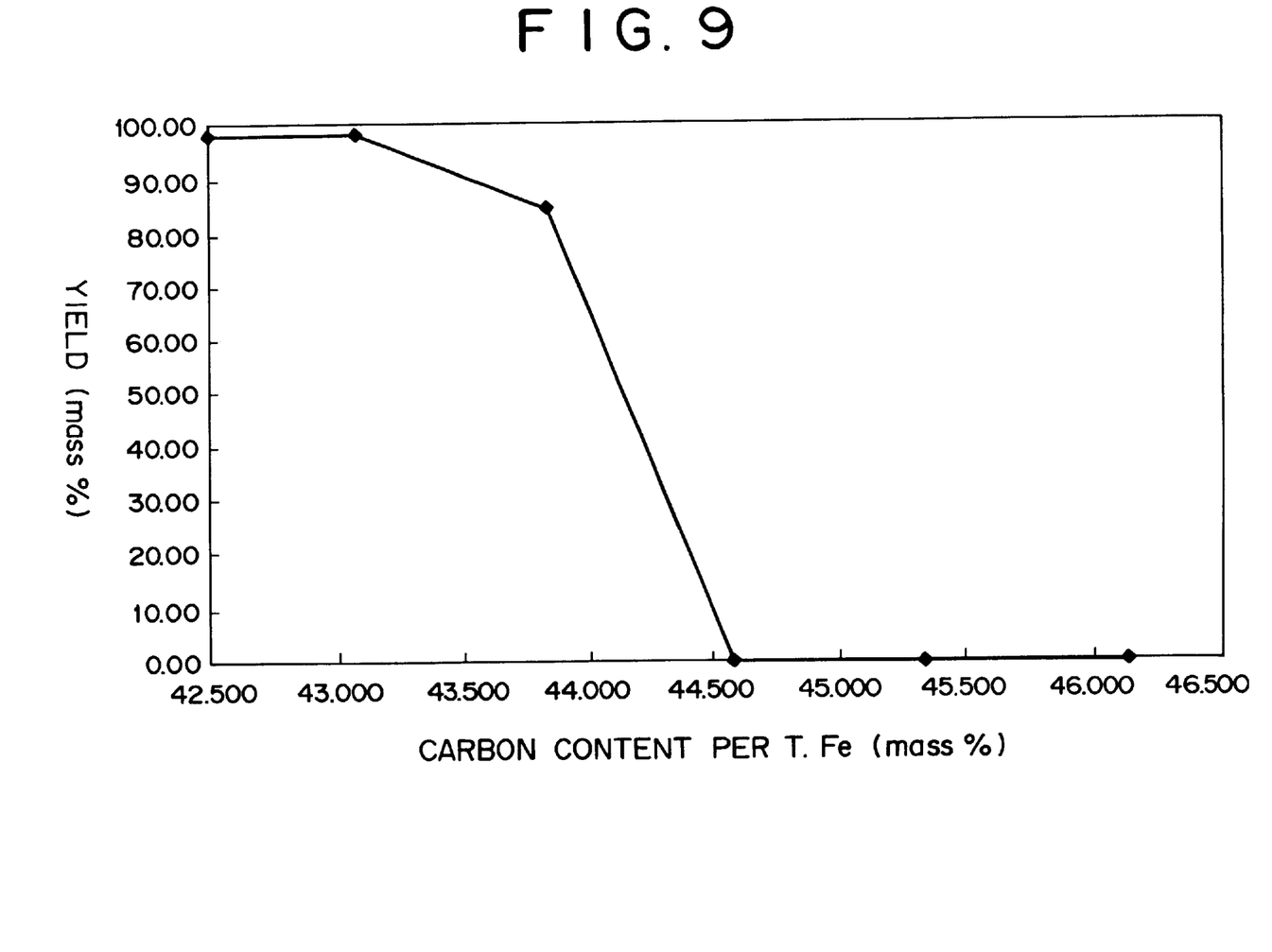
FIG. 9 is a graph showing the effects that the carbonaceous material content in relation to the quantity of T. Fe in iron ore of the raw material affects on the yield of metallic iron nuggets when the melting temperature is set to 1460° C.

In addition, FIGS. 8 and 9 are graphs showing the effects that the carbonaceous material content in relation to iron oxide component (iron oxide component: T. Fe) in an iron oxide-containing material (iron ore) mixed as raw material affects on the yield of metallic iron nuggets, of which drawings FIG. 8 shows the effects when the melting temperature of metallic iron reduced by reduction is set to 1400° C. and FIG. 9 shows the effects when the melting temperature is set to 1460° C. As apparent from these drawings, also in this case, the yield of metallic iron nuggets is considerably changed depending on the temperature at the melting period; when the melting temperature is set to 1400° C., the yield abruptly decreases when the carbonaceous material content is at least about 44.2%, and at least 80% of the yield can be obtained if the carbonaceous material content is not more than 44%, further and at least a level of 90% of the high yield can be secured if the carbonaceous material content is restrained to be not more than about 43.6%. As compared to this, when the melting temperature is set to 1460° C., while the yield is abruptly decreased if the carbonaceous material content exceeds a level of 45% as shown in FIG. 8, and at least 80% of the yield can be obtained if the carbonaceous material content is restrained to be not more than about 45%, further and at least a level of 90% of the high yield can be secured if the carbonaceous material content is further restrained to be not more than 44.8%. As apparent from these results, it can be seen that when the carbonaceous material content is in a level of 45%, it is possible to produce metallic iron having an appropriate grain diameter with at least 80% of the high yield by setting the melting temperature to be at least 1460° C. and when the carbonaceous material content is not more than a level of 44%, it is possible to secure a sufficient yield even if the melting temperature is lowered to about 1400° C.

However, in reducing/melting furnaces used for embodiment of the present invention, it is frequent to employ burner heating in heating the raw material. In this case, a large quantity of CO gas is generated by the reaction between iron oxide source and carbonaceous material in raw material charged into the furnace, so that in the reduction period, sufficient reductive atmosphere will be maintained adjacent to the raw material by a shielding effect of the above CO gas which is naturally emitted.

However, from the latter half to the end of reduction period, the generation of CO gas is abruptly decreased, so that the self-shielding effect will be decreased and the reduced metallic iron is likely to be re-oxidized because metallic iron is likely to be affected by combusted emission gas (oxidative gas such as $CO_2$ and $H_2O$). Furthermore, although the melting and the coalescing of fine metallic iron is proceeded because the melting point is lowered due to the carburization of reduced iron by remaining carbon of raw material after completion of reduction, the self-shielding effect will also be insufficient in the stage so that the metallic iron will be likely to be re-oxidized.

Therefore, in order to proceed the melting and the coalescing efficiently after the reduction while restraining the re-oxidization, it is desired to appropriately control the composition of atmosphere gas in the melting zone. As means desired for this purpose, it is possible to charge powdery carbonaceous material onto the hearth or attach carbonaceous material on the surface of raw material previously if the raw material is prepared in the form of compacts, prior to charging it onto the hearth. That is, if the powdery carbonaceous material is charged on the surface of hearth or the carbonaceous material is attached on the surface, then in the melting period after completion of reduction, reduced material immediately reacts with oxidative gas ($CO_2$ or $H_2O$) produced by burner combustion so that high reductive atmosphere can be maintained adjacent to the metallic iron produced by the reduction, whereby the re-oxidization can be possibly prevented. Furthermore, this powdery carbonaceous material is desired because it becomes a carburization source for the produced metallic iron and serves to shorten the time needed for the carburization and melting of metallic iron and to promote coalescing thereof.

In order to allow the above carbonaceous material to effectively exhibit its acting effects, it is desirable to use fine powdery carbonaceous material having a grain diameter not more than 3 mm, preferably, not more than 2 mm, and particularly preferably in the range of 0.3–1.5 mm and to charge it to a thickness, preferably in the range of 2–7 mm and more preferably in the range of 3–6 mm. If raw material is used in the form of compacts and carbonaceous material is attached on the surfaces of the compacts, it is desirable to set the attached content preferably in the range of 1–10 mass % and more preferably in the range of 3–7 mass % of those compacts. However, it is also possible to charge the powdery carbonaceous material by scattering it from the upper side before melting period at which time its effect is mostly expected.

The metallic iron nuggets obtained by the above method is product that coalesces while excluding collaterally produced slag and thus have a very high Fe purity containing little slag component. While the metallic iron nuggets can be transported to a conventional steel-making equipment such as an electric furnace and a rotary furnace to be used as an iron source, so it is desired to reduce the sulfur [S] content as low as possible in order to use it as raw material for steel-making. Therefore, the inventors performed to obtain low-sulfur metallic iron nuggets by removing the sulfur component contained in iron ore or carbonaceous material as much as possible and confirmed that if proper quantity of CaO source (including calcium hydroxide and calcium carbonate besides quicklime) is mixed with iron ore or carbonaceous material in the raw material preparation process to adjust basicity (i.e. ratio of $CaO/SiO_2$) of entire slag forming component contained in raw material, to which slag forming component such as gangue component contained in iron ore and the like is added, to be in the range of 0.6–1.8 and more preferably in the range of 0.9–1.5, the sulfur content in finally obtained metallic iron nuggets can be lowered not more than 0.10% and even not more than 0.5%.

In addition, coal that is most generally used as carbonaceous reducing agent conventionally contains sulfur in the range of about 0.2%–1.0% and most of sulfur enters into metallic iron. On the other hand, if the basicity adjustment by adding of CaO source is not performed, although there may be some differences depending the types of iron ore and the like, the basicity calculated from slag forming component included in raw material is not more than 0.3% in most case and it is unavoidable that sulfur is admixed (vulcanizing) to metallic iron nuggets from slag having such a low basicity in the process of reduction or melting and coalescing process thereafter, so that about 85% of entire sulfur contained in raw material is entered into metallic iron nuggets. As a result, the sulfur content in metallic iron nuggets becomes a very high value of 0.1–0.2% and deteriorates the quality as metallic iron nuggets.

However, if the basicity of composition of slag forming component is adjusted to be in the range of 0.6–1.8 by adding CaO source aggressively in the raw material preparation process as explained in the above, the above sulfur is fixed within the slag which is collaterally produced at the time of reduction, carburization, melting and coalescing, as a result, the sulfur content in metallic iron nuggets can be drastically lowered, for example, to a level of 0.050–0.080%. It is considered that the mechanism for lowering sulfur is caused because sulfur included in raw material reacts with CaO (CaO+S=CaS) and is fixed as CaS.

As explained in the above, the raw materials used in the present invention are homogeneous mixture including iron oxide source and carbonaceous material, granules formed by agglomerating the homogeneous mixture together with a small quantity of binder (bentonite, starch and the like) to have an appropriate size as desired, or compacts such as pellets and briquettes. The compacts can be made by employing a conventional compacting method using, for example, a disc type pelletizer, a drum type pelletizer and the like.

Iron oxide source used as raw material is a broad concept including mill scale and the like besides iron ore, and it may include, for example, blast furnace dust, electric arc furnace dust, steel-making dust and the like. Metal oxide such as Ni, Cr, Mn, may be included in addition to iron oxide according to iron ore producing places, and there is no doubt that other metal oxides besides these metals can also be included. Furthermore, carbonaceous reducing agent is not limited to a certain type and it is also possible to use charcoal powder besides coal powder and coke powder, which are most common. As a binder which is mixed as needed, bentonite, starch and the like are illustrated, but there is no reason that it is limited to them. In addition, it is preferred to add proper quantity of CaO source (quicklime, calcium hydroxide, calcium carbonate and the like) for adjusting basicity of regulating the slag forming component in the raw material mixture, because they act as a desulfurizing agent to fix sulfur included in the raw material mixture to the slag side, whereby it is possible to obtain metallic iron nuggets with low sulfur content.

And, as a melt adjusting agent for slag which is collaterally produced in the reduction process, it may be effective to add calcium source such as limestone, calcium hydroxide, and calcium carbonate, silica, alumina and the like in a proper quantity according to the composition of slag forming component in the raw material.

In supplying raw material onto the surface of hearth, any special method is not employed but it is sufficient to use a method, in which raw material is taken out by a hopper, a vibrating feeder, a drum feeder or the like and then supplied through a trough, a pipe or an inclined plate.

When raw material is charged in a layer form, it is preferred to form peak part and valley part of optional shapes on the surface of raw material layers to a unevenness in the longitudinal direction and/or cross direction and extend the surface area to increase heating efficiency by burner heating or radiated heat from the upper side, because the unevenness can increase heating efficiency of entire raw material and simultaneously increases heat transfer efficiency to the lower side layer of raw material layers. Although the preferred shape, size and pitch of the unevenness can not be indiscriminately determined but varied depending on a stacking thickness, it is confirmed that it is desired if the height (distance between peak part and valley part) is in the range of 5–30 mm, and more preferably in the range of 10–30 mm, and the preferable pitch (distance between adjacent peaks) is in the range of 10–100 mm, and more preferably in the range of 10–70 mm. There is no special limit to the method of forming the unevenness and the unevenness which can be formed by optionally adopting a method in which charging is performed by changing the charge quantity from a plurality of feeding openings in the widthwise of the hearth, a method in which charging is performed by changing the charge quantity from an unevenness-shaped hopper mounted to be extended in the widthwise of the furnace, a method of forming an unevenness by patterning a surface shaping member having unevenness after charging substantially horizontal, and the like.

In addition, in the case of using compacts as raw material, it is desired to use those having the mean diameter, preferably in the range of 1–10 mm, and more preferably 3–7 mm, because they may be distorted depending on their sizes when they are particularly stacked and charged onto a hearth due to stacking load. If compacts have such a small diameter, they can be supplied while they are not yet dried because they are hardly distorted by a stacking pressure even if they are stacked and charged and they may be rapidly dried by initial heating as some of those compacts have a high heat transfer rate. Furthermore, in order to more certainly prevent damage due to an impact at the time of charging and stacking load, it is recommended as a preferred embodiment of the present invention to charge at least the compacts of surface layer after drying them in advance.

In charging the raw material, the raw material is charged after the powdery carbonaceous material has been spread on the hearth, or if the compacts are used, the method of charging the compacts onto the hearth after attaching the carbonaceous material on the compacts is adapted and for example, following effects can be obtained:

a) the carbonaceous material raises the reduction degree of atmosphere gas adjacent to raw material at the time of reduction and proceeds the reduction efficiently;

b) the carbonaceous material carburizes metallic iron after completing the reduction and lowers the melting point thereof, thereby promoting melting and coalescing;

c) the carbonaceous material restrains attachment of molten metallic iron onto the hearth, thereby promoting coalescing;

d) the lack of reduction in a lower layer side, which is easily caused when the raw material is stacked as a layer form and charged, is supplemented by the carbonaceous material, thereby raising entire reduction ratio;

e) the carbonaceous material rapidly acts and reduces FeO which is easily produced due to the lacking of reduction in the lower layer side, so that the production of molten slag containing FeO, which may cause melting trouble in the refractory material of hearth eminently, is restrained and the life of hearth can be lengthened; and f) in the case of using the raw material as compacts, if carbonaceous material is attached on the surfaces of the compacts in a painted form, it becomes possible to charge the compacts of raw material while they are not in the dried state, because they are prevented from attaching each other or onto the hopper for charging or the like.

The carbonaceous material used herein is optionally selected from coal powder, coke powder, charcoal powder and the like. A preferred grain diameter for effectively exhibiting the above acting effects efficiently as carbonaceous material which spreads on the top surface of hearth is not more than the mean grain diameter, preferably of 2 mm, and more preferably of 1.5 mm. When the carbonaceous material is attached onto the surfaces of compacts of raw material, it is sufficient to adopt a method of attaching the carbonaceous material which has the mean grain diameter not more than about 0.3 mm is attached in a painted form, a method of dispersing carbonaceous material in a dispersion media such as water and spraying to be attached, and the like.

Although the above carbonaceous material or carbonaceous reducing agent in the raw material (carbonaceous material which was charged into the furnace in the powdered form or which was produced when raw material pellets became powdered) may be discharged from the reducing/melting furnace together with metallic iron nuggets, they may be reused as carbonaceous reducing agent. Since they were once exposed to a high temperature within the furnace and volatile matter was removed from them, they will be good quality raw material.

EXAMPLE

Herein below, while the construction and acting effect of the present invention will be particularly described with reference to an example which is not intended to limit the present invention, it is possible to embody the present invention after appropriately changing it to be suitable for the gist explained above and to be explained below and it is intended that all of such changes are included within the technical scope of the present invention.

Example 1

The inventors performed a test for producing metallic iron nuggets using the following component composition as an iron oxide source and carbonaceous material and using a rotary hearth type reducing/melting furnace as shown in FIGS. 1 to 3, under the following conditions.

Iron Oxide Source

Iron ore: main components: T. Fe; 68.1%; $Al_2O_3$; 0.5%, $SiO_2$; 1.4%, mean grain diameter, 50 μm Carbonaceous Reducing Agent Carbonaceous material (1): fixed carbon content; 71.6%, volatile matter content; 19.6%, mean grain diameter: 30 μm Carbonaceous material (2): fixed carbon content; 77.0%, volatile matter content; 9.4%, mean grain diameter: 30 μm Raw Material Preparation After mixing and homogeneously blending the iron oxide source and carbonaceous materials (1) and (2), the inventors prepared granular raw material that have a grain diameter of 16–19 mm using a pan type pelletizer.

Experimental Method

The granular raw material is charged into the rotary hearth type reducing/melting furnace to a thickness of about 20 mm, burner heating is performed for 4 minutes from the raw material charging, thereby rapidly raising the temperature to 1100° C., the reduction is performed at about 1350° C., then temperature adjustment is performed to raise the temperature of melting section to about 1400° C. or to about 1460° C., molten and coalescing metallic iron is cooled in a cooling section (using a water-cooling jacket provided lower part of the hearth), and metallic iron nuggets is obtained. The interval from the completion of charging raw materials to the time that the metallic iron nuggets are taken out of the furnace is set to about 10–12 minutes. By separating metallic iron nuggets taken out of the furnace from collaterally produced slag discharged simultaneously using a magnetic separator, further separating them into coarse granules and fine granules using a sieve having meshes of 3.35 mm, calculation of the yield of coarse granules having a grain diameter of at least 3.35 mm is performed.

Specifications and production ratio including mixing compositions of raw material, fixed carbon content and volatile matter content are collectively shown in TABLE 1. Based on the results of TABLE 1, "the effect that the fixed carbon content in carbonaceous material affects on the yield of metallic iron nuggets" in TABLES 2 and 3, and FIGS. 4 and 5; "the effect that the volatile matter content in raw material affects on the yield of metallic iron nuggets" in TABLES 4 and 5, and FIGS. 6 and 7; and "the effect that the carbonaceous material content relating to iron oxide component (T. Fe) affects on the yield of metallic iron nuggets" in TABLES 6 and 7, and FIGS. 8 and 9 are presented.

TABLE 1

| Testing No. | 1 | 2 | 3 | 4 | 5 | 6 |
|---|---|---|---|---|---|---|
| Mixing content of iron ore, (F): (g) | 76.09 | 76.41 | 76.71 | 77 | 77.29 | 77.55 |
| Mixing content of carbonaceous material, (G): (g) | 23.91 | 23.59 | 23.29 | 23 | 22.71 | 22.45 |
| T. Fe in iron ore: (%) | 68.1 | 68.1 | 68.1 | 68.1 | 68.1 | 68.1 |
| Mass of T. Fe in iron ore, (A): (g) | 51.82 | 52.04 | 52.24 | 52.44 | 52.63 | 52.81 |
| Mixing ratio of carbonaceous material (1): (%) | 100 | 80 | 60 | 40 | 20 | 0 |
| Mass of carbonaceous material (1): (g) | 23.91 | 18.87 | 13.97 | 9.2 | 4.54 | 0 |
| Fixed carbon content ratio in carbonaceous material (1): (%) | 71.6 | 71.6 | 71.6 | 71.6 | 71.6 | 71.6 |
| Fixed carbon content in carbonaceous material (1), (B): (g) | 17.12 | 13.51 | 10.01 | 6.59 | 3.25 | 0 |
| Volatile matter content ratio in carbonaceous material (1): (%) | 19.6 | 19.6 | 19.6 | 19.6 | 19.6 | 19.6 |
| Volatile matter content in carbonaceous material (1), (D): (g) | 4.69 | 3.7 | 2.74 | 1.8 | 0.89 | 0 |
| Mixing ratio of carbonaceous material (2): (%) | 0 | 20 | 40 | 60 | 80 | 100 |
| Mass of carbonaceous material (2): (g) | 0 | 4.72 | 9.32 | 13.8 | 18.17 | 22.45 |
| Fixed carbon content ratio in carbonaceous material (2): (%) | 77 | 77 | 77 | 77 | 77 | 77 |
| Fixed carbon content in carbonaceous material (2), (B): (g) | 0 | 3.63 | 7.17 | 10.63 | 13.99 | 17.29 |
| Volatile matter content ratio in carbonaceous material (2): (%) | 9.4 | 9.4 | 9.4 | 9.4 | 9.4 | 9.4 |
| Volatile matter content in carbonaceous | 0 | 0.44 | 0.88 | 1.3 | 1.71 | 2.11 |

TABLE 1-continued

| Testing No. | 1 | 2 | 3 | 4 | 5 | 6 |
|---|---|---|---|---|---|---|
| material (2), (D): (g) | | | | | | |
| G/F: carbonaceous material content per iron: (%) | 31.4 | 30.9 | 30.4 | 29.9 | 29.4 | 28.9 |
| G/F: carbonaceous material content per iron (If No. 1 is 100) | 100 | 98 | 97 | 95 | 94 | 92 |
| G/A: carbonaceous material content per T. Fe: (%) | 46 | 45.3 | 44.6 | 43.9 | 43.1 | 42.5 |
| (B + C)/A: fixed carbon content per T. Fe: (%) | 0.33 | 0.33 | 0.33 | 0.33 | 0.33 | 0.33 |
| B/A | 0.33 | 0.26 | 0.19 | 0.13 | 0.06 | 0 |
| C/A | 0 | 0.07 | 0.14 | 0.2 | 0.27 | 0.33 |
| (B + C)/G: fixed carbon content in carbonaceous material: (%) | 71.6 | 72.68 | 73.76 | 74.85 | 75.92 | 77 |
| (D + E)/(F + G): volatile matter content in raw material | 4.69 | 4.14 | 3.61 | 3.1 | 2.6 | 2.11 |
| Yield of metallic iron nuggets at 1400° C.: (%)* | Not molten | Not molten | Not molten | 84.6 | 98.5 | 97.7 |
| Yield of metallic iron nuggets at 1460° C.: (%)* | 31.61 | 56 | 98.9 | 98.3 | More than 99 | More than 99 |

*Yield of metallic iron nuggets having a grain diameter of at least 3.35 mm

TABLE 2

| Fixed carbon content in carbonaceous material (mass %) | Yield of iron nuggets having at least 3.35 mm at 1460° C. (mass %) |
|---|---|
| 71.6 | 31.61 |
| 72.68 | 56 |
| 73.76 | 98.9 |
| 74.84 | 98.3 |
| 75.92 | 99 |
| 77 | 99 |

TABLE 3

| Fixed carbon content in carbonaceous material (mass %) | Yield of iron nuggets having at least 3.35 mm at 1400° C. (mass %) |
|---|---|
| 71.6 | 0 |
| 72.68 | 0 |
| 73.76 | 0 |
| 74.84 | 84.6 |
| 75.92 | 98.5 |
| 77 | 97.7 |

TABLE 4

| (D + E)/(F + G) volatile matter content in raw material (mass %) | Yield of iron nuggets having at least 3.35 mm at 1460° C. (mass %) |
|---|---|
| 4.69 | 31.61 |
| 4.14 | 56 |
| 3.61 | 98.9 |
| 3.11 | 98.3 |
| 2.6 | 99 |
| 2.11 | 99 |

TABLE 5

| (D + E)/(F + G) volatile matter content in raw material (mass %) | Yield of iron nuggets having at least 3.35 mm at 1400° C. (mass %) |
|---|---|
| 4.69 | 0 |
| 4.14 | 0 |
| 3.61 | 0 |
| 3.11 | 84.6 |
| 2.6 | 98.5 |
| 2.11 | 97.7 |

TABLE 6

| G/A carbonaceous material content per T. Fe (mass %) | Yield of iron nuggets having at least 3.35 mm at 1460° C. (mass %) |
|---|---|
| 46.143 | 31.61 |
| 45.335 | 56 |
| 44.583 | 98.9 |
| 43.862 | 98.3 |
| 43.135 | 99 |
| 42.51 | 99 |

TABLE 7

| G/A carbonaceous material content per T. Fe (mass %) | Yield of iron nuggets having at least 3.35 mm at 1400° C. (mass %) |
|---|---|
| 46.143 | 0 |
| 45.335 | 0 |
| 44.583 | 0 |
| 43.862 | 84.6 |
| 43.135 | 98.5 |
| 42.51 | 97.7 |

As a study from these results has been previously explained herein before with reference to FIGS. 4 to 9, for example, it can be confirmed that:

1) when a carbonaceous material having at least 73% of the fixed carbon content is used, it is possible to produce metallic iron nuggets having an appropriate grain diameter with at least 80% of the high yield by setting the melting temperature to be at least 1460° C., and when good quality carbonaceous material having at least a level of 74.5% of the fixed carbon content is used, it is possible to secure a sufficient yield even if the melting temperature is lowered to about 1400° C.;

2) when the volatile matter content in raw material is in a level of 3.8%, it is possible to produce iron nuggets having an appropriate grain diameter with at least 80% of the high yield by setting the melting temperature to be at least about 1460° C. and when the volatile matter content is not more than a level of 3.2%, it is possible to secure a sufficient yield even if the melting temperature is lowered to about 1400° C.; and 3) when the carbonaceous material content in relation to iron oxide component (T. Fe) in iron ores is in a level of 45%, it is possible to produce metallic iron nuggets having an appropriate grain diameter with at least 80% of the high yield by setting the melting temperature to be at least 1460° C. and when the carbonaceous material content is not more than a level of 44%, it is possible to secure a sufficient yield even if the melting temperature is lowered to about 1400° C.

The present invention is constituted as explained in the above, whereby it becomes possible to produce metallic iron nuggets having an appropriate grain size distribution for transporting or handling them as a product with a high yield and good productivity by using carbonaceous materials having a predetermined fixed carbon content or volatile matter as raw material, or in addition, by appropriately adjusting the mixing content of carbonaceous material in relation to iron oxide source when producing metallic iron nuggets by heating and reducing raw materials including an iron oxide source and carbonaceous reducing agent.

What is claimed is:

1. A method of producing metallic iron nuggets comprising:

heating a raw material comprising a carbonaceous reducing agent and an iron oxide-containing material in a reducing zone of a furnace, thereby reducing the iron oxide in the raw material in the solid state, and forming solid metallic iron, then heating and melting the metallic iron produced by the reduction in a melting zone of the furnace, thereby simultaneously coalescing the metallic iron and separating the metallic iron from slag component, thereby forming metallic iron nuggets.

2. The method according to claim 1, wherein the carbonaceous reducing agent has a carbon content of at least 73% based on the total weight of the carbonaceous reducing agent.

3. The method according to claim 2, wherein the carbon content of the carbonaceous reducing agent is at least 74.5%.

4. The method according to claim 1, wherein the raw material has a volatile matter content of not more than 3.9% by weight.

5. The method according to claim 4, wherein the volatile matter content of the raw material is not more than 3.2% by weight.

6. The method according to claim 1, wherein the amount of the carbonaceous reducing agent relative to the iron oxide component of the iron oxide-containing material is not more than 45% by weight.

7. The method according to claim 6, wherein the amount of the carbonaceous reducing agent relative to the iron oxide component of the iron oxide-containing material is not more than 44% by weight.

8. The method according to any of claims 2, 4 and 6, wherein said heating and melting is carried out at a temperature of at least 1460° C.

9. The method according to any of claims 3, 5 and 7, wherein said heating and melting is carried out at a temperature of at least 1400° C.

10. The method according to claim 1, wherein the carbonaceous material comprises a mixture of a carbonaceous material having a carbon content of at least 73% based on the total weight of the carbonaceous reducing agent and a carbonaceous material having a low carbon content.

11. The method according to claim 1, wherein a powdery carbonaceous material is charged adjacent to the raw material, before the metallic iron produced by reduction is molten in the furnace.

12. The method according to claim 1, wherein metallic iron nuggets having a grain diameter in the range of 3–40 mm are obtained at a yield of at least 80%.

13. The method according to claim 1, wherein metallic iron nuggets having a grain diameter in the range of 3–40 mm are obtained at a yield of at least 90%.

14. The method according to claim 1, wherein a slag melting point adjusting agent is mixed with said raw material and the melting point of slag produced during the reducing and melting steps is adjusted to be not more than 1400° C.

15. The method according to claim 1, wherein a part or all of a powdery carbonaceous material or carbonaceous reducing agent in said raw material which is discharged out of the furnace together with said metallic iron nuggets from said furnace is reused as a carbonaceous reducing agent in said raw material.

* * * * *